Patented Aug. 17, 1943

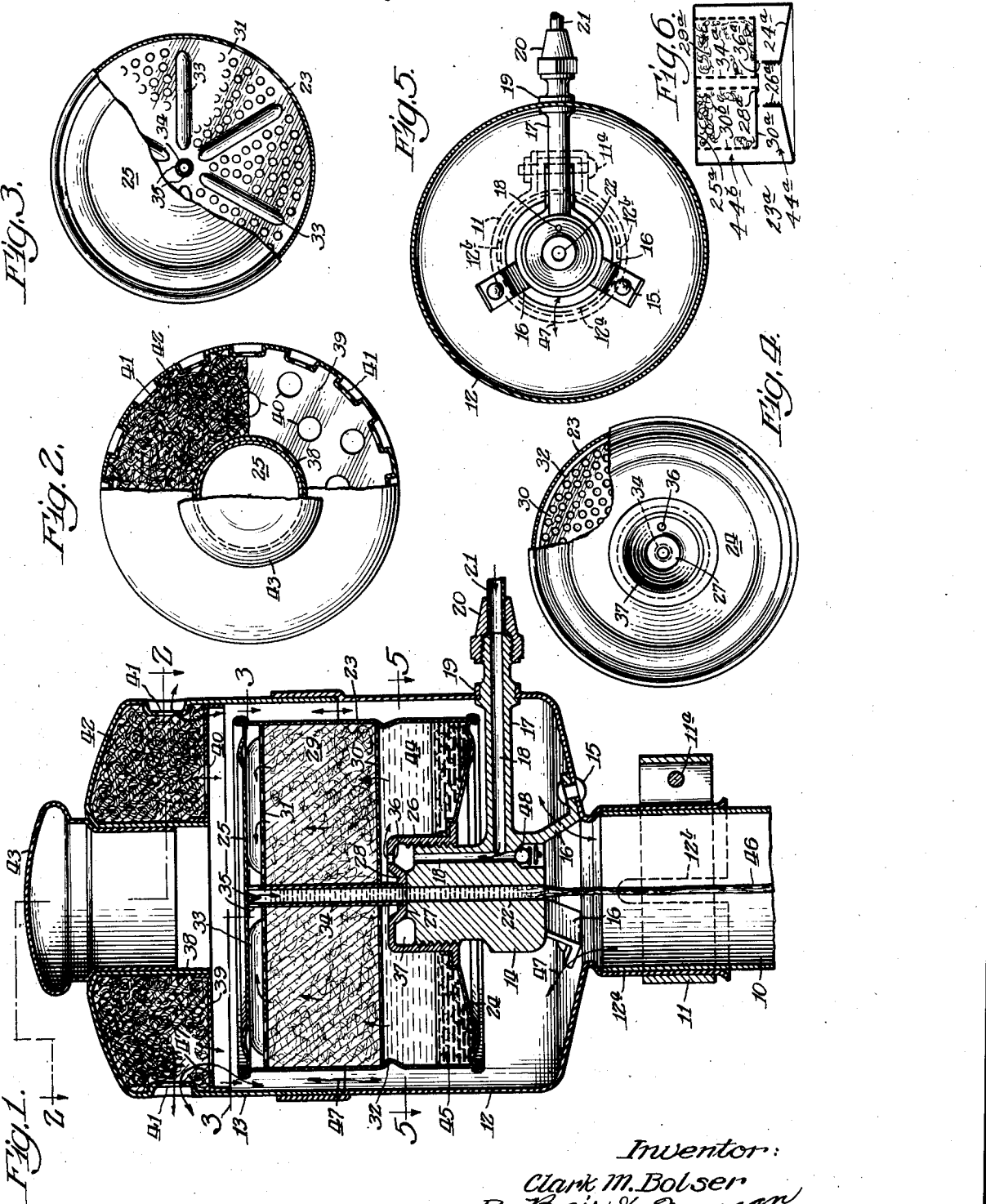

2,327,011

UNITED STATES PATENT OFFICE 2,327,011

OIL FILTER

Clark M. Bolser, Cedar Falls, Iowa

Application May 12, 1939, Serial No. 273,269

5 Claims. (Cl. 123—196)

An object of my present invention is to provide an oil filter which is inexpensive to manufacture due to its simplicity of construction and which includes a filter insert that is economical to manufacture and can therefore be periodically replaced without great expense.

Another object is to provide an oil filter particularly adapted for use in connection with automobile engines and including a housing that can be readily mounted on the breather tube of the automobile and connected with any part of the oiling system under pressure, whereby the necessity of mounting brackets for the filter are entirely eliminated.

A further object is to provide an oil filter which includes a removable insert, the insert having within it a filter bed and also a sediment trap so that when the filter insert is removed, the sediment is also removed with it and can be thrown away thus eliminating the necessity of cleaning out a sediment sump as in the usual type of oil filter.

Another object is to provide the sediment trap arranged below the filter bed so that the oil to be filtered passes upwardly through the filter bed and the sediment therefrom settles in the sediment trap, the trap being relatively large so as to decrease the velocity of the oil thus permitting a considerable percentage of the sediment to settle out of the oil before it passes through the filter bed.

Another object is to provide an oil filter which can be readily connected with the supply of oil under pressure by the use of only one connection to receive the oil, the oil being discharged in a small stream down the center of the breather tube so that breathing air passing in and out of the breather tube will effectively carry out vapors from the filtered oil.

Still another object is to provide a housing for the filter insert having a space in it for the breathing air to pass around the filter and warm the filter thus hastening the filter action particularly when the engine is operated from a cold start, the housing having a relatively large air filter for communicating the interior of the housing to atmosphere in such manner that the breathing air passes in and out of the air filter at a relatively low velocity.

Another object is to provide a filler opening for replenishing the supply of oil, such opening being located centrally of the air filter and over the filter insert so that oil poured into the filler opening flows down over the filter insert and then into the breather tube.

Still a further object is to provide a filter insert which has a fitting that coacts with a fitting in the housing of the oil filter with both an inlet and an outlet connection made through the coacting fittings of the housing and filter insert thus eliminating the necessity of connections at opposite ends of the filter insert.

With these and other objects in view my invention consists in the construction, arrangement and combination of the various parts of my device, whereby the objects contemplated are attained, as hereinafter more fully set forth, pointed out in my claims and illustrated in the accompanying drawing. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawing, in which:

Figure 1 is a vertical sectional view through an oil filter embodying my invention and showing it mounted on the breather tube of an automobile.

Figure 2 is a view partly in plan elevation and partly in section on the line 2—2 of Figure 1.

Figure 3 is a similar view partly in plan elevation and partly in section on the line 3—3 of Figure 1 and showing only the filter insert of my oil filter.

Figure 4 is a bottom plan view of my filter insert.

Figure 5 is a sectional view of my oil filter on the line 5—5 of Figure 1; and Figure 6 is a diagrammatic view of a modified structure.

On the accompanying drawing I have used the reference numeral 10 to indicate a breather tube of an automobile engine or the like. These breather tubes are usually capped with an air filter which I remove and in place of it substitute a housing 12 having a cover 13. To positively retain the housing 12 on the breather tube 10 I provide a clamp 11 and a clamp bolt 11a. The housing 12 has a tubular extension 12a surrounding the breather tube 10 and the clamp 11 in turn surrounds the sleeve 12a. The sleeve 12a may be notched as at 12b to permit contraction thereof around the breather tube 10 when the clamp bolt 11a is tightened.

Within the housing 12 I provide a fitting 14 secured to the housing as by rivets 15 passing through a plurality of circumferential feet 16 formed on the fitting.

The fitting 14 has a tubular extension 17 and formed in this extension and in the fitting 14 is an inlet or oil receiving passageway 18. The extension 17 passes through a boss 19 of the housing 12 and may be soldered or brazed thereto. On its outer end a nut 20 is provided for attaching a copper tube 21 to the extension 17. The tube 21 may extend to any part of the oiling system of the automobile where the oil is under pressure (by way of example the oil line to the pressure gauge may be tapped for this purpose), the fitting 14 also includes an oil discharging or outlet passageway 22.

Within the housing 12 is a detachable filter insert comprising a casing 23 having bottom and top walls 24 and 25. A fitting 26 is soldered or otherwise sealed to the bottom 24 and screw threadedly coacts with the fitting 14. The fittings 14 and 26 are provided with coacting seats 27 and 28.

Within the casing 23 is a filter bed 29 formed of suitable fibrous material such as cotton waste or the like and confined between a lower perforated plate 30 and an upper perforated plate 31. The plate 30 is supported on a peripheral bead 32 of the casing 23 while the plate 31 is spaced from the top 25 of the filter insert casing by radial ribs 33.

A return tube 34 extends through the plates 30 and 31 and has its lower end seated in the fitting 26. Its upper end may be notched as at 35 to permit reception of oil into the return tube 34 from the space in the casing 23 between the plate 31 and the top 25.

The fitting 26 is provided with a passageway 36 which communicates with an annular space 37 formed in the fittings 14 and 26 surrounding the seats 27 and 28. The return tube 34 is substantially aligned with the passageway 22 while the passageway 18 opens into the annular space 37.

The cover 13 has a central sleeve 38 constituting a filler opening. A bottom plate 39 is provided in the cover 13 and is perforated as at 40. At the periphery of the cover 13 air openings 41 are provided which communicate with atmosphere within the cover 13 above the plate 39 and surrounding the sleeve 38 I provide air filtering material 42 such as oiled copper wool or the like.

A closure member 43 is provided for the filler opening 38. It may be formed of suitable material such as sheet metal.

*Practical operation*

Oil pumped into the copper tube 21 under pressure will flow through the passageway 18 into the annular space 37 and then through the passageway 36 into a space 44 in the filter insert casing 23. The space 44 serves as a sediment sump or trap below the filter bed 29. As the space 44 is relatively large when compared with the passageways 18 and 36 the velocity of the oil entering it will be greatly reduced thus permitting gravity to settle a considerable percent of the sediment therefrom as indicated at 45.

The oil then flows upwardly through the plate 30, filter bed 29 and plate 31 and any sediment prevented from passing through the filter bed tends to settle to the bottom of the sediment trap 45. The filtered oil flows between the beads 33 to the notches 35 and enters the return tube 34. It then passes downwardly through the return tube and through the seats 28 and 27 and the passageway 22 to finally fall as a small stream 46 down the center of the breather tube 10. Breathing air which continually passes in and out of the breather tube 10 as indicated by the arrows 47 completely surrounds the oil stream 46 thus carrying off any vapors therefrom which reduces crank case dilution to a minimum. The breathing air is filtered by the air filter 42 and passes through the air openings 41 at a greatly reduced velocity because of the considerable number of openings 41 in the periphery of the cover 13. The construction of the air filter is such that it surrounds the filler opening 38 and thereby provides considerable peripheral extent for the air openings 41 thus gaining the desired low velocity air interchange through the filter 42 to minimize any passage of oil droplets to atmosphere.

When it is desirable to supply the engine with new oil, the filler plug 43 may be removed and the oil poured in so that it passes over the filter insert and down into the breather tube 10 between the supporting legs 16 of the fitting 14. Thus my oil filter does not interfere with the normal functioning of the filler tube.

The filter insert consisting of the parts 23 to 34 inclusive and having the sediment trap 44 therein may be economically formed of sheet tin with the exception of the fitting 26 which may be a heavier metal stamping. Thus it is feasible to entirely discard the filter insert when it has filtered the oil during two or three thousand miles of driving. It is a comparatively simple matter to remove the cover 13 and then unscrew the filter insert, throw it away and replace it with a new one. The cover 13 may then be replaced and the entire operation takes less than a minute's time. The coaction of the fittings 14 and 26 is such that both inlet and outlet connections are made to the filter and sediment trap without the use of tools or any complication of operation. If it so happens that the seats 27 and 28 do not properly cooperate, leakage may occur across from the passageway 18 to the passageway 22, but no harm is done except that the desired filtering action does not occur. If the filter becomes clogged, a bypass valve 48 between the passageway 18 and the bottom of the fitting 14 will open, the spring of the valve being set at a pressure somewhat in excess of that developed by the pump connected with the tube 21 under normal operating conditions.

By including the sediment trap in the detachable filter insert there is no necessity whatever of cleaning out the sediment after the filter insert is removed. This greatly simplifies the servicing of the filter and makes it possible to service it without the service man getting his hands all oily or spilling oil on the engine in any way. The filter insert is mounted in the housing 12 so that it is subject only to the breathing air passing through the housing and can do no more than collect a slight film of oil from the vapors passing through the housing.

In Figure 6 I show diagrammatically a modified structure in which parts having the same general characteristics are provided with the same reference numerals with the addition of *a*. The fitting 26a supports an outer casing consisting of a bottom 24a, a peripheral wall 23a and a top wall 25a. Within this casing the means for holding the filter bed 29a consists of an imperforate bottom wall 30a, a perforate tube 34a and a perforate peripheral wall 30b. This arrangement provides a sediment sump or collecting space 44a and a sediment gravitating space 44b, the oil flowing from the fitting 14 of Figure 1 flows radially outward through openings 36a into the sediment collecting space 44a and then upwardly through the gravitating space 44b. It thereupon flows horizontally instead of vertically through the filter bed 29a from the perforate wall 30b to the perforate tube 30a. From the tube it then drops downwardly by gravity as in the structure shown in Figure 1. This arrangement is a little more efficient from the standpoint of settling out the sediment and preventing it from passing into the filter.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In an oil filter, a housing mounted on a breather tube, a removable cover for said housing to permit addition of fresh oil to the breather tube, a self contained filter insert detachably mounted in said housing and comprising a filter bed, a sediment trap and an imperforate casing for said filter bed and sediment trap, said imperforate casing containing and completely enclosing all of said filter bed therein upon removal of said insert from said housing, an oil connection to discharge oil into said sediment trap, and means to discharge oil from said filter bed into said breather tube.

2. In a filter of the character disclosed, a housing adapted for mounting on a breather tube of an engine, a removable cover for said housing to permit fresh oil passage to the breather tube, a fitting in said housing having an inlet passageway and an outlet passageway, said housing being open to said breather tube and to atmosphere, and means detachably mounted on said fitting for filtering sediment from oil leaving said fitting through said inlet passageway and returning to said outlet passageway thereof, said outlet passageway being so arranged as to discharge the filtered oil in a stream into a part of the breather tube which permits breathing air passing therethrough around such stream to carry away vapor from such filtered oil and discharge it through said housing to atmosphere.

3. In a filter of the character described, a housing adapted for mounting on a breather tube of an engine, a fitting therein having an oil receiving passageway and an oil discharging passageway, means mounted on said fitting for filtering oil passing from said oil receiving passageway to said oil discharging passageway, said oil discharging passageway being located substantially on the axis of said breather tube whereby to discharge filtered oil in a stream through the center thereof and surrounded by breathing air passing through the breather tube whereby to effect carrying off of vapor from the discharged oil, said breathing air passing around said filter means to heat the same, a cover for said housing having a central opening to receive replacement oil, a closure member therefor, and an air filter surrounding said opening and closure member and having air openings communicating with atmosphere and arranged at the periphery of said cover.

4. In a filter structure, a housing adapted for mounting on a breather tube of an engine, a fitting therein having an oil receiving passageway and an oil discharging passageway, means mounted on said fitting for filtering oil passing from said oil receiving passageway to said oil discharging passageway, space in said housing for breathing air to pass around said filter means, a cover for said housing having an opening to receive replacement oil to be supplied to the breather tube around said filter means while it remains therein, and a closure member therefor.

5. In a filter of the character described, a housing adapted for mounting on a breather tube of an engine, a fitting therein having an oil receiving passageway and an oil discharging passageway, means mounted on said fitting for filtering oil passing from said oil receiving passageway to said oil discharging passageway, said oil discharging passageway effecting discharge of filtered oil in a stream into said breather tube whereby breathing air passing threthrough effects carrying off of vapor from the filtered oil, said breathing air passing around said filter, and a cover for said housing having air openings communicating with atmosphere and arranged at the periphery of said cover.

CLARK M. BOLSER.